United States Patent [19]

Kido et al.

[11] Patent Number: 5,732,149
[45] Date of Patent: Mar. 24, 1998

[54] APPARATUS FOR EXTRACTING AN IRRADIATION FIELD REGION FROM A RADIATION IMAGE

[75] Inventors: Atsushi Kido; Hitoshi Yoshimura; Hisashi Yonekawa; Akiko Yanagita; Sumiya Nagatsuka, all of Hino, Japan

[73] Assignee: Konica Corporation, Tokyo, Japan

[21] Appl. No.: 853,810

[22] Filed: May 9, 1997

Related U.S. Application Data

[63] Continuation of Ser. No. 351,715, Dec. 8, 1994, abandoned.

[30] Foreign Application Priority Data

Dec. 24, 1993 [JP] Japan ................................. 5-327596

[51] Int. Cl.$^6$ .................................................. G06K 9/00
[52] U.S. Cl. ........................... 382/128; 382/132; 382/190; 250/492.1; 250/587
[58] Field of Search ........................................ 382/128, 190, 382/132; 250/587, 492.1; 364/413.13, 413.24

[56] References Cited

U.S. PATENT DOCUMENTS

| | | | |
|---|---|---|---|
| 4,859,850 | 8/1989 | Funahashi et al. | 250/587 |
| 5,515,450 | 5/1996 | Takeo et al. | 382/132 |

FOREIGN PATENT DOCUMENTS

| | | | |
|---|---|---|---|
| 61-72091 | 4/1986 | Japan | C09K 1/86 |
| 5-7579 | 1/1993 | Japan | G06F 5/62 |

Primary Examiner—Jose L. Couso
Assistant Examiner—Anh Hong Do
Attorney, Agent, or Firm—Frishauf, Holtz, Goodman, Langer & Chick

[57] ABSTRACT

An irradiation field region extracting apparatus for extracting an irradiation field region from a given radiation image. According to a first embodiment, image data corresponding to the radiation image is rotationally moved around a predetermined rotational center of the image data, with the image data having rectangular coordinates set thereon. A boundary line is extracted between the irradiation field region, where the radiation image is exposed, and an irradiation field stop region, where no radiation image is exposed, according to the image data rotationally moved by the rotational movement means. A parallel condition of the boundary line is detected wherein the boundary line is parallel to an axis of the image data, and rotation information data is generated which indicate an angle of a rotational movement of the boundary line from an original location to a location of the parallel condition and a distance between the predetermined rotational center and a given point on the boundary line. A linear equation of the boundary line, originally located before the rotational movement, is calculated in accordance with the rotation information data, and a region, which is surrounded by a plurality of boundary lines calculated in accordance with the linear equation, is extracted as the irradiation field region.

5 Claims, 15 Drawing Sheets

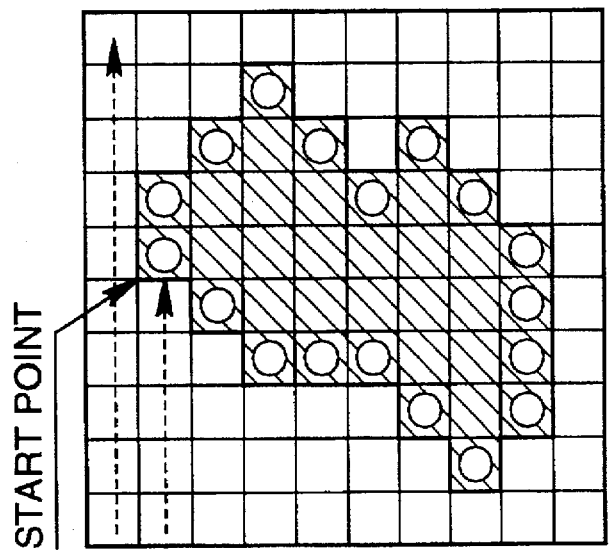
FIG. 13 (c)
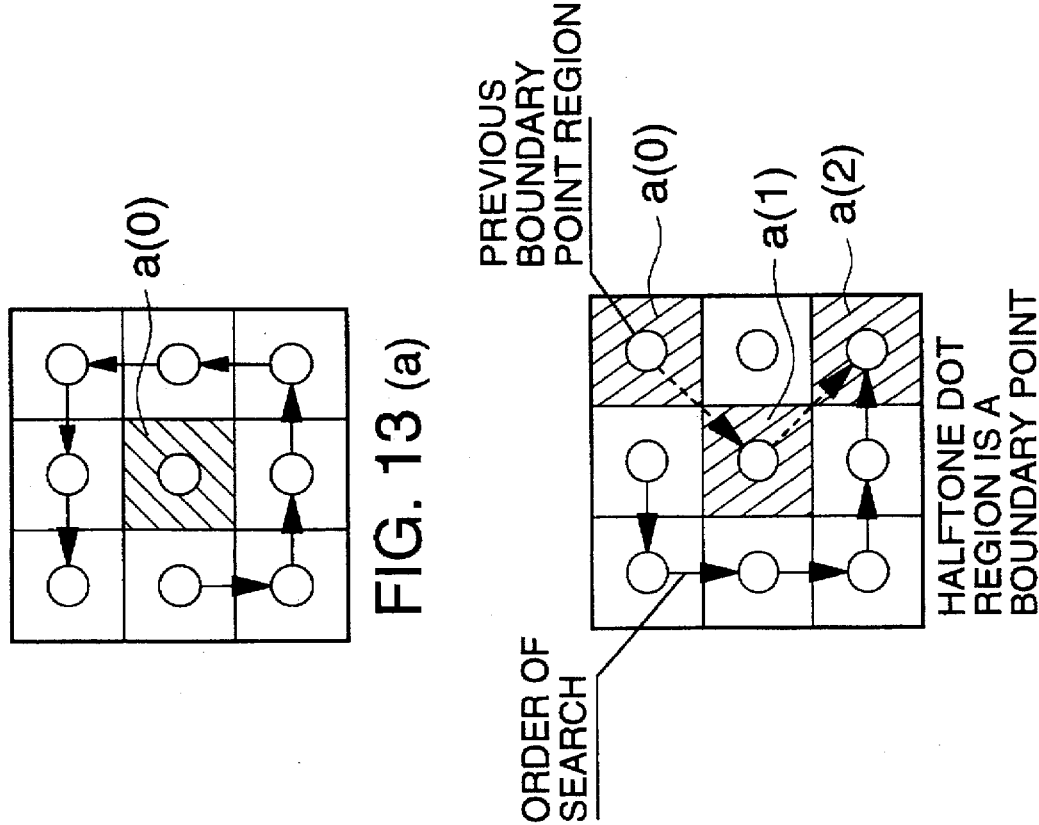
FIG. 13 (a)
FIG. 13 (b)

IRRADIATION REGION

IRRADIATION FIELD STOP REGION

APPARATUS FOR EXTRACTING AN IRRADIATION FIELD REGION FROM A RADIATION IMAGE

This application is a Continuation of application Ser. No. 08/351,715, filed Dec. 8, 1994, now abandoned.

BACKGROUND OF THE INVENTION

The present invention relates to an irradiation field region extracting apparatus for radiation images. More particularly, the present invention relates to an improvement in the technique for extracting only an irradiation field region from a radiation image photographed under when an irradiation field stop operation is conducted.

Radiation images such as X ray images are frequently used for making a diagnosis. In order to provide an X ray image, X rays transmitted through a photographic object are irradiated on a fluorescent material layer (fluorescent screen) so that visual light is generated from the fluorescent material layer. Then a silver salt photographic film is irradiated with this visual light and developed in the same manner as that of a common photographic film. The aforementioned radioactive ray photograph is widely used.

However, there is a tendency recently that films coated with silver salt are not used for this purpose but images are directly derived from fluorescent material layers.
Specifically, the following method is adopted.

Radioactive rays transmitted through a photographic object are absorbed by fluorescent material. Then the fluorescent material is excited by light or thermal energy. Therefore, radioactive energy accumulated in the fluorescent material is emitted in the form of fluorescence. This fluorescence is subjected to photoelectric conversion so as to provide an image signal. The thus obtained radiation image signal is outputted to a printer or CRT as it is, or alternatively the thus obtained radiation image signal is subjected to image processing and outputted to a printer or CRT so that the image signal is made to be visible. In many cases, the image signal is processed and digitalized with a computer.

In this connection, it is necessary to reduce an area exposed to radioactive rays as small as possible for the sake of health, and it is also necessary to prevent the dispersion of radioactive rays sent from a portion not related to diagnosis. For the above reasons, an irradiation field stop operation is conducted, in which lead plates and others are disposed on a portion of the photographic object or on a radioactive ray source so that the irradiation field of radioactive rays can be restricted with respect to the photographic object.

In the image processing of a digital radiation image such as gradation processing or spatial frequency processing, the processing condition is determined by the statistical characteristics of the image data, for example, the maximum, minimum and histogram of the image data, so that the concerned region can be finely processed. However, when the irradiation field stop operation is conducted in the manner described above, the statistical characteristics of the image data are affected by the data of the irradiation field stop portion which has not been directly exposed to radioactive rays. Therefore, the entire image data is deviated to a side on which an amount of transmitted radioactive rays is small. For this reason, the image processing condition can not be appropriately determined.

For example, as illustrated in FIG. 16, a lung field region, which is a concerned region in the bust radiation image, is recognized using the local maximum and local minimum in the projection of longitudinal and lateral directions, and the gradation processing condition is determined in accordance with the histogram or the accumulated histogram of the image data in the lung field region. When a lower portion of the image is subjected to the irradiation field stop operation as illustrated in FIG. 17, the projection is made while the stopping-down portion is included. Therefore, it is impossible to correctly recognize the lung field region, that is, the lung field region is recognized while the stopping-down portion is included. Accordingly, in the case illustrated in FIG. 17, the gradation processing condition is determined using the histogram or the accumulated histogram of image data in the lung field region which has been mistakenly recognized. As a result, the gradation processing is conducted in accordance with the image data, the gradation of which is low in general. Accordingly, the image becomes white after the completion of processing, so that the contrast of the image becomes inappropriate.

In order to solve the above problems, it is necessary that the irradiation field portion is previously extracted, and it is also necessary that the concerned region detection and condition determination are conducted only in accordance with the image data in the irradiation field. Japanese Patent Publication Open to Public Inspection No. 7579/1993 discloses a method by which the irradiation field region is extracted.

The essential points of this method will be described below.

(1) Image data is divided into small regions.

(2) A dispersion value of image data in each small region is found.

(3) Lines and rows including small regions by not less than a predetermined number, the dispersion values of which are not less than a predetermined value, are assumed to be boundary line.

(4) A region surrounded by the boundary line is extracted as the irradiation field region.

In the small region including the boundary line, the lightness (density) of image data in the irradiation field stop region is remarkably higher (smaller) than that in the irradiation field region. Accordingly, the image data is dispersed onto the low lightness (high density side and the high lightness (low density) side, so that the dispersion values become high. Due to the foregoing, it is possible to discriminate that the small region is a region including the boundary line, and it is possible that lines and rows are assumed to be a boundary line, in which the small regions including the boundary line are laterally and longitudinally continued.

In the technique of the prior art described above, with respect to the small regions, the dispersion values of which are not less than a predetermined value, it is assumed that the boundary lines are located in the longitudinal and lateral directions. The reason is as follows. As disclosed in Japanese Patent Publication Open to Public Inspection No. 7579/1993, a configuration of the irradiation filed of the image data is a reckangle which is parallel with a side of the image.

However, in some cases, depending on a portion of the photographic object, the rectangular irradiation field is located being inclined with respect to the side of an image as illustrated in FIG. 18. In this case, the boundary lines are not continued in the line and row directions. Therefore, the technique of the prior art can not be adopted.

The configuration of the irradiation field region, moreover, is not limited to the aforementioned rectangle, but may be a polygon, an arc or other arbitrary configuration. In such cases, it is demanded that the irradiation field region be extracted.

SUMMARY OF THE INVENTION

The present invention has been achieved in view of the above problems of the prior art. The first object of the present invention is to provide an irradiation field region extracting apparatus for radiation images characterized in that the irradiation field region can be extracted even when the rectangular irradiation field is inclined with respect to the side of an image or even when a photographic object is photographed in an irradiation field, the configuration of which is not rectangular but polygonal.

The second object of the present invention is to provide an irradiation field region extracting apparatus for radiation images characterized in that the irradiation field region of an arbitrary configuration can be extracted.

The first irradiation field region extracting apparatus for radiation images of the present invention is an irradiation field region extracting apparatus for a radiation image formed in accordance with an amount of transmission of radioactive rays irradiated on each portion of a photographic object. The first irradiation field region extracting apparatus for radiation images of the present invention includes the means shown by the solid lines in FIG. 1.

In FIG. 1, a rotational movement means rotationally moves image data around a predetermined rotational center. The rotational movement is continued until a parallel condition detecting means detects that a line corresponding to the boundary line between the irradiation field region and the irradiation field stop region becomes parallel with the axis of rectangular coordinates which have been set on the image.

After the parallel condition has been detected, in the linear equation calculating means, a linear equation of the boundary line before the rotation is calculated in accordance with a rotational angle and a distance from the rotational center to the boundary line.

An irradiation region field extracting means determines a region surrounded by a plurality of boundary lines using a linear equation, and the region is extracted as in irradiation field region.

In this case, the boundary extracting means may be composed of the means shown by dotted lines in FIG. 1.

The small region dividing means longitudinally and laterally divides an image region of the radiation image into a plurality of small regions. The characteristic value calculating means calculates a characteristic value of image data included in the small region. The boundary line is extracted in accordance with the small region and its characteristic value.

Examples of the value used as the characteristic value are: a dispersion value included in the small region, a standard deviation included in the small region, and a difference between the maximum of image data and the minimum of image data included in the small region.

The second irradiated field region extracting device for radiation images of the present invention includes two means shown in FIG. 2.

In FIG. 2, the boundary point extracting means extracts a boundary point between the irradiation field region and the irradiation field stop region. After that, it traces a group of the candidate points close to the boundary point, and successively extracts the boundary points. A region surrounded by the group of the extracted boundary points is assumed to be the irradiation field region, and the irradiated field region extracting means conducts its extraction.

In this case, as illustrated in FIG. 2, the boundary point extracting means may include a small region dividing means and a characteristic value calculating means. These means function in the same manner as that of the boundary line extracting means in the first irradiation field region extracting device described above. The characteristic value is calculated for each small divided region, and the boundary point is extracted in accordance with the characteristic value. In the same manner as that described before, examples of the value used as the characteristic value are: a dispersion value included in the small region, a standard deviation included in the small region, and a difference between the maximum of image data and the minimum of image data included in the small region.

The third irradiation field region extracting apparatus for radiation images of the present invention includes the means shown in FIG. 3.

Various information is inputted into the photographing information input means at the time of photographing a radioactive image. The irradiation field region extraction processing selecting means selects an irradiation field region extracting means for conducting the most appropriate irradiation field region extracting processing from the plurality of irradiation field region extracting means in accordance with the photographing information sent from the photographing information input means. In this way, the irradiation field region extracting processing is carried out.

In this case, the photographing portion, photographing posture, photographic object information, photographing method and photographing condition may be combined so as to be used as photographing information.

The plurality of irradiation field region extracting means may use at least one of the configurational characteristics, positional characteristics and image quality characteristics. The irradiation field region extraction processing selecting means may select the irradiation field region extracting means in which the characteristics of a photographed image is utilized in accordance with the photographing information.

There is provided a threshold value adjusting means, and a threshold value of the parameter necessary for the extracting processing at the irradiation region extracting means may be adjusted in accordance with at least one of the configurational characteristics, positional characteristics and image quality characteristics.

Operation of the first irradiation field region extracting apparatus for radiation images is described as follows.

When a rectangular irradiating field region is photographed under the condition that the region is located being inclined with respect to a side of the image, or when a polygonal irradiating field region is photographed, an inclination is caused on a boundary line between the irradiation field region and the irradiation field stop region.

In this case, a linear equation of the boundary line at the initial position before rotation can be easily calculated from a rotational angle obtained when image data is rotated so that the boundary line becomes parallel with a side of the image, and also from a distance between the rotational center and the boundary line. When all of the boundary line are found, a portion surrounded by the boundary line can be extracted as the irradiation field region.

When the extraction of the boundary line is conducted in such a manner that the image region is divided into small regions and the boundary line is found by the characteristic value of image data in the small region, the boundary line can be extracted from a relatively small amount of image data.

In this case, in the small region including the boundary line, the irradiation field region and the irradiation field stop region are included in the periphery of the boundary line. Accordingly, when the dispersion value and standard deviation of the image data included in the small region are used as a characteristic value, and also when the difference between the maximum and the minimum of the image data is used as a characteristic value, the boundary line can be easily extracted.

Operation of the second irradiation field region extracting apparatus for radioactive images is described as follows.

In this case, it is possible to extract an irradiation field region, the configuration of which is arbitrary, for example, an arc and a curve, wherein the boundary line between the irradiation field region and the irradiation field stop region is formed into a curve. Raster scanning is conducted, and in accordance with the image data, one boundary point is found. When the point is located on a correct boundary line, another boundary point is to be found in the periphery of the aforementioned one boundary point because the boundary points are linearly connected. Therefore, when the aforementioned one identified boundary point is used as a starting point and a group of the boundary point candidates are traced in the periphery of the one identified boundary point, the next boundary point can be found. In the same manner, successive boundary points are successively found. It is then possible to extract a portion surrounded by the boundary points as an irradiation field region. As described above, after one boundary point has been found, only the periphery of the boundary point is traced so as to find a new boundary point. Accordingly, while the tracing operation is minimized, an irradiation region having an arbitrary configuration can be extracted.

Even in this case, the extraction of boundary points can be conducted in such a manner that the image region is divided into small regions and the characteristic value is calculated for each small region in accordance with the image data, so that a highly accurate extraction can be conducted in a short period of time.

Operation of the third irradiation field region extracting apparatus for radioactive images is described as follows.

In this case, the irradiation field region is extracted by utilizing the characteristics of different irradiation field regions depending upon the photographing condition. The photographing condition is obtained from the photographing information input means into which the photographing condition has been inputted. According to the photographing information, the characteristic of the irradiation field region is estimated. According to the estimated characteristic, the most appropriate irradiation field region extracting means is selected, and a highly accurate extraction is conducted in a short period of time.

A photographed portion, a photographed posture and pieces of information about the photographic object are used as the photographing information. Examples of the information about the photographic object are: a patient's figure and a physical constitution of a patient, a patient's age, and patient's sex. These pieces of information are very effective for determining the configuration and position of the irradiation field region. The quality of a photographed image is affected by the photographing method and condition, so that the irradiation field extraction is conducted in accordance with the image quality.

According to the aforementioned various photographing information, the configurational characteristic of the irradiation field region, the positional characteristic of the irradiation field region and the characteristic of the image quality may be combined so that the most appropriate irradiation field region extracting means can be selected.

When the parameters necessary for the irradiation field region extraction processing are adjusted in accordance with the aforementioned characteristics, the extraction accuracy can be enhanced.

DETAILED DESCRIPTION OF THE INVENTION

Figure 11:
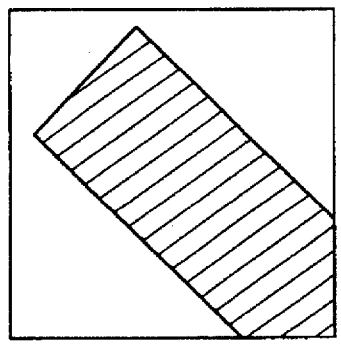
Figure 11:
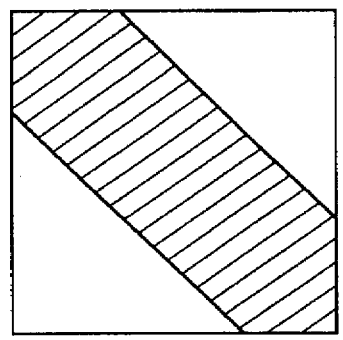
Figure 11:
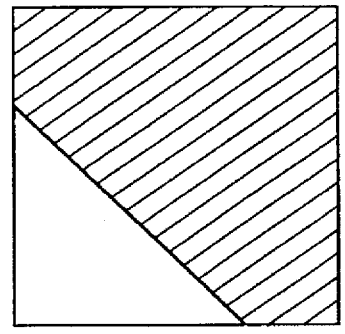
Figure 11:
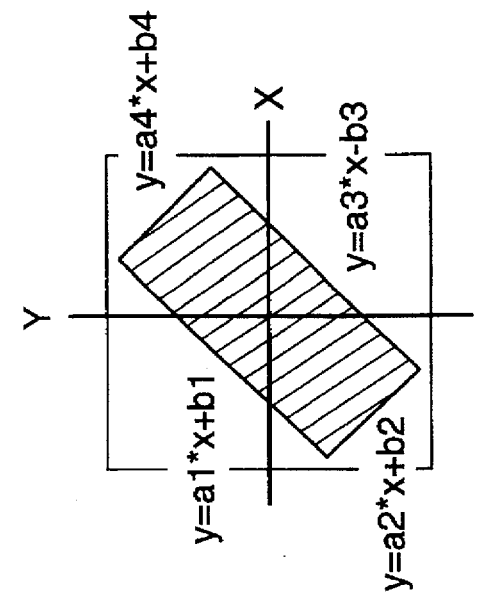

FIG. 11($a$) to 11($d$) are views showing the circumstances of the irradiation field region extraction in the example of the first invention.

Figure 12:
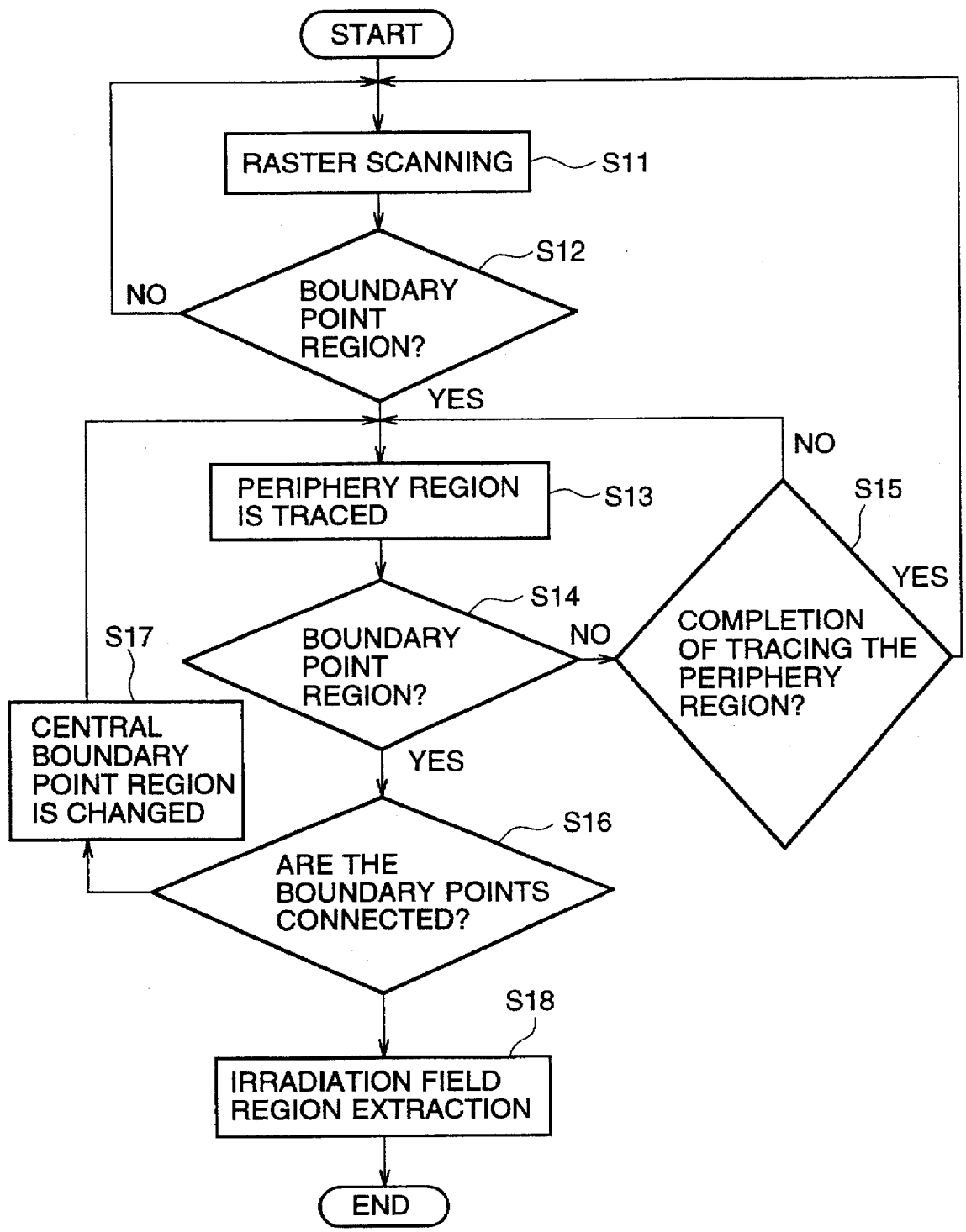

FIG. 12 is a flow chart showing the circumstances of the extraction of the irradiation field region in the example of the second invention.

FIG. 13($a$) to 13($c$) are views showing the circumstances of the extraction of the first boundary point region conducted by raster scanning and also showing the circumstances of the boundary point region extraction conducted by tracing the peripheral region.

Figure 14:
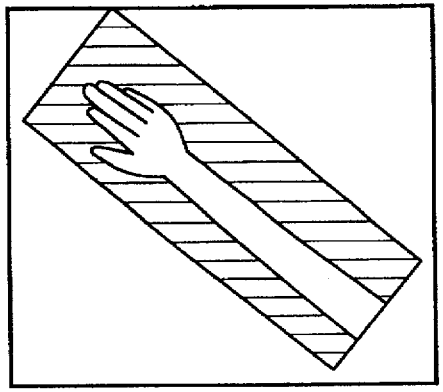
Figure 14:
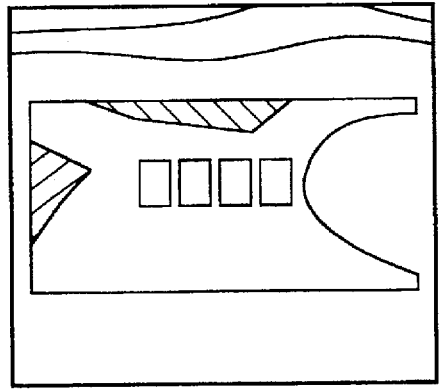
Figure 14:
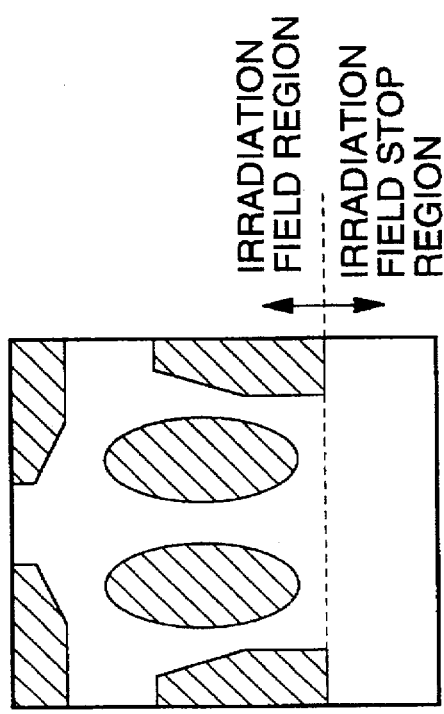
Figure 14:
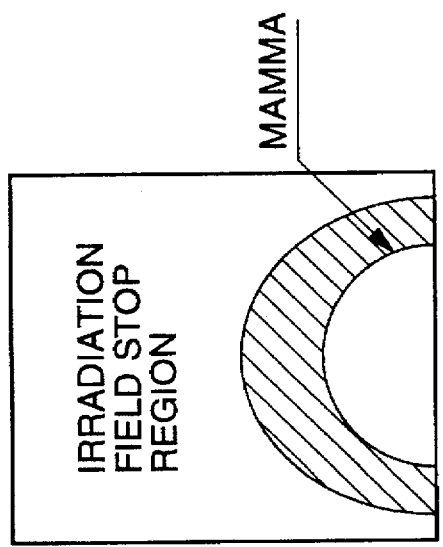

FIG. 14($a$) to 14($d$) are views showing the configuration and position of the irradiation field region in different photographed images.

Figure 15:
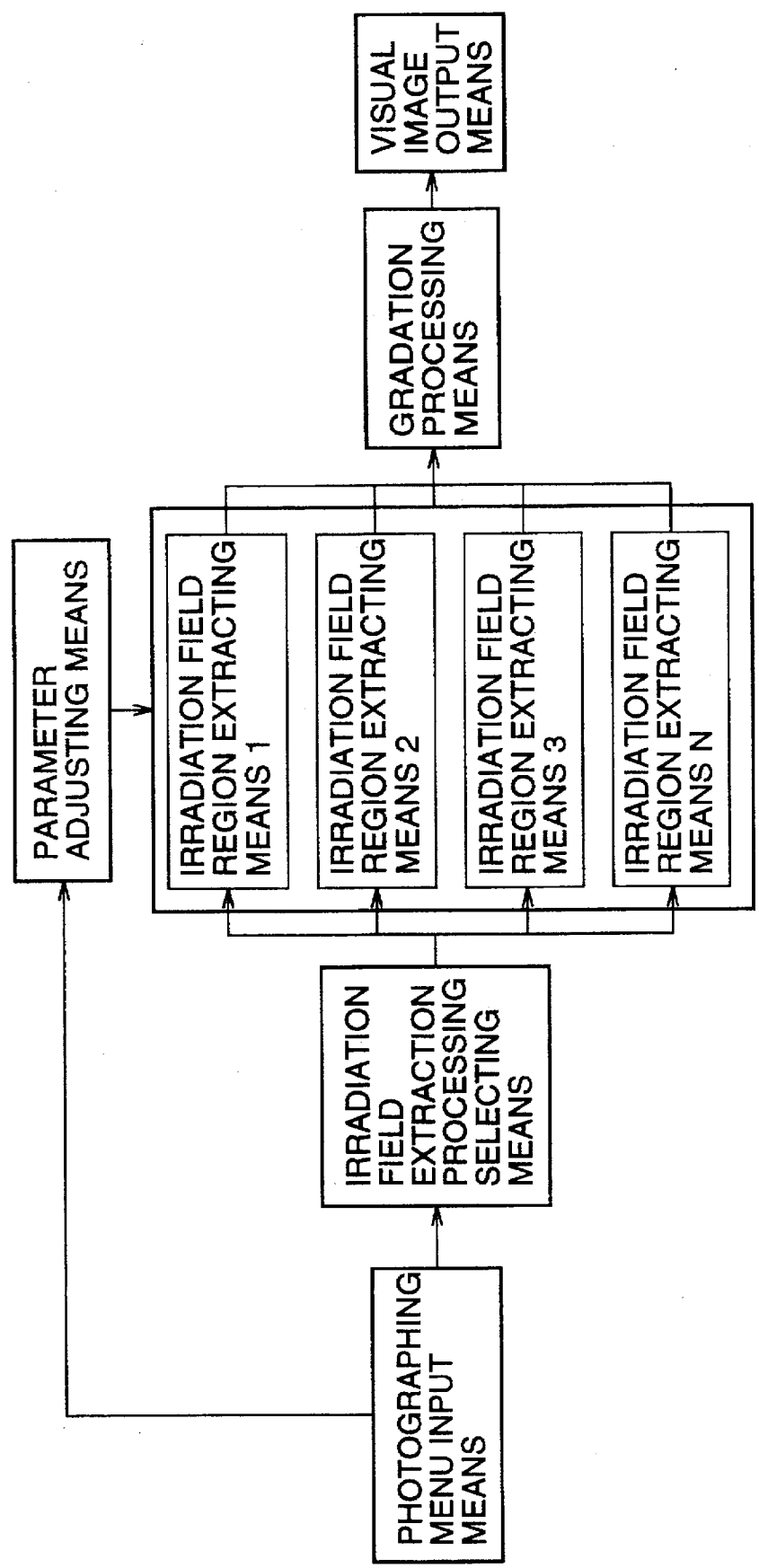

FIG. 15 is a view showing the essential construction of the example of the third invention.

Figure 16:
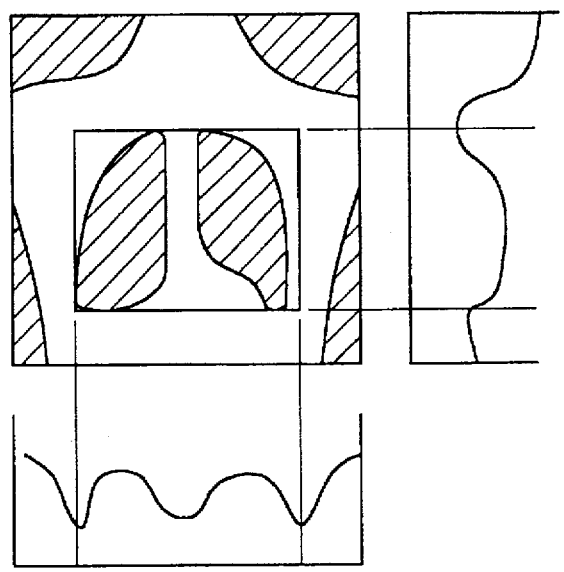

FIG. 16 is a view showing the circumstances of recognition of the lung field region conducted by projection.

Figure 17:
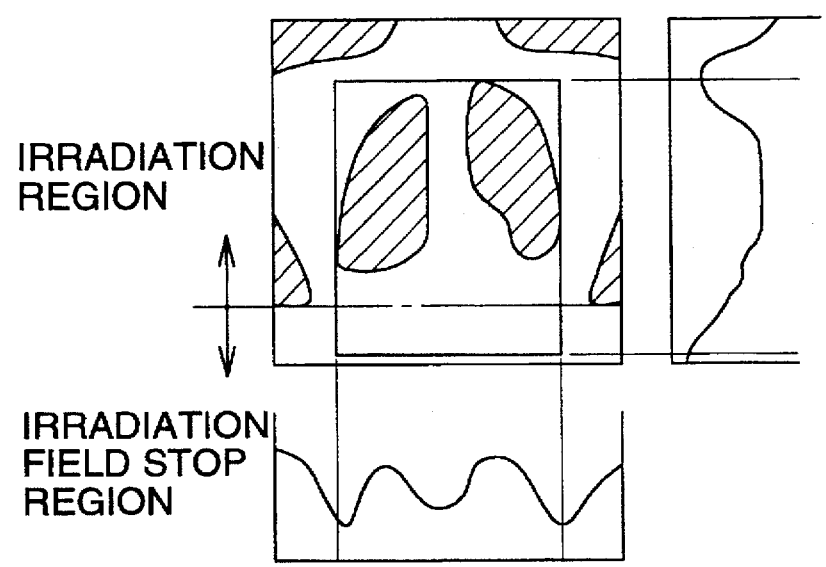

FIG. 17 is a view showing the circumstances of erroneous recognition of the lung field region conducted by projection.

Figure 18:
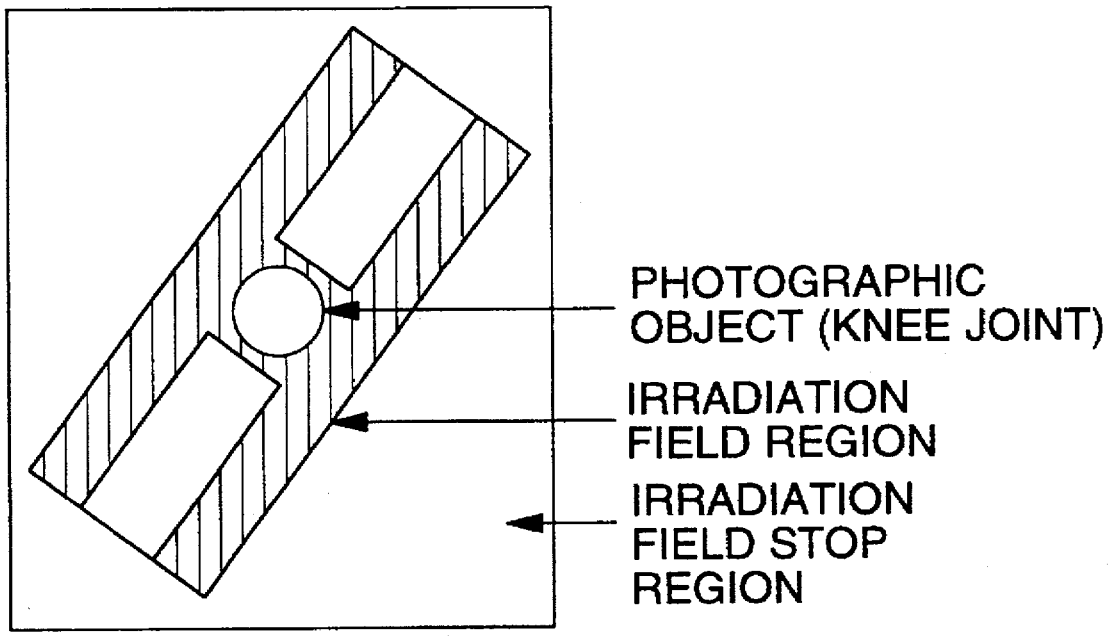

FIG. 18 is a view showing an image photographed under the condition that the rectangular irradiation field region is inclined.

DETAILED DESCRIPTION OF THE INVENTION

An example of the present invention will be explained below.

Figure 4:
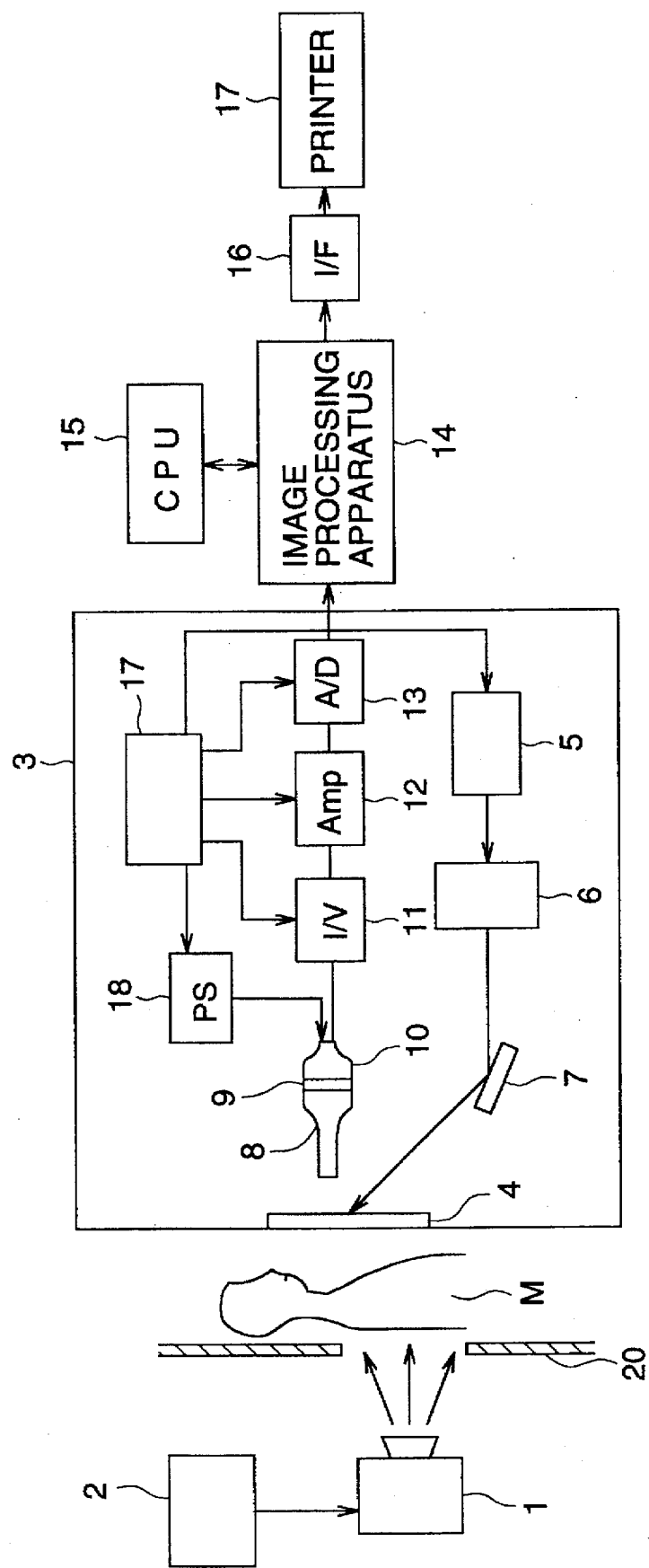
FIG. 4 is a schematic illustration showing the overall system of the example of the present invention.

FIG. 4 shows an example of the present invention, which is a radiation image recording and reading apparatus for medical use including the irradiation field region extracting apparatus for radiation images of the present invention. In this example, the present invention is applied to radioactive ray photography for photographing a human's bust for medical purpose.

In this case, the radioactive ray generating source 1 is controlled by the radioactive ray control unit 2, and radioactive rays (X rays) are irradiated toward a human's bust M (photographic object). In this example, there is provided a shielding plate 20 made of lead between the radioactive ray generating source 1 and the human's bust M. Only an opening of the shielding plate 20 is used as the irradiation field of radioactive rays. While the irradiation field stop is conducted in this way, the photographic object is subjected to radioactive ray photography.

The recording and reading unit 3 is provided with a radiation image conversion panel 4 which is opposed to the radioactive ray source 1 while the bust M is interposed between the radiation image conversion panel 4 and the radioactive ray source 1. A latent image of the bust M is formed on the conversion panel 4 in such a manner that the radioactive ray energy is accumulated on a stimulation fluorescent material layer of the conversion panel 4 in accordance with the distribution of the radioactive ray transmission ratio of the bust M with respect to an amount of irradiated radioactive ray emitted from the radioactive ray source 1.

The conversion panel 4 constructed in the following manner:

A stimulation fluorescent layer is provided on a support by means of vapor phase deposition, or alternatively a stimulation fluorescent coating is coated on the support. In order to prevent the stimulation fluorescent layer from being damaged by the environment, it is shielded or coated with a protective member. In this connection, stimulation fluorescent materials are disclosed in Japanese Patent Publication Open to Public Inspection Nos. 72091/1986 and 75200/1984.

A beam of light, the emergent intensity of which is controlled, is generated by the light beam generating section (gas laser, solid laser and semiconductor laser) 5. The generated light beam passes through various optical systems and arrives at the scanning device 6. Then the beam of light is deflected in the scanning device 6, and the optical path of the beam of light is deflected by the reflecting mirror 7. After that, the beam of light is sent onto the conversion panel 4 as the stimulation scanning light.

The light beam converging unit 8 is located close to the conversion panel 4 on which the scanning operation is conducted by the stimulation scanning light, and a light beam converging end composed of optical fibers is located close to the conversion panel 4. This light beam converging end receives the stimulation light from the conversion panel 4, the light emitting intensity of which is proportional to the latent image energy on the conversion panel 4. Reference numeral 9 is a filter which only allows the light in the wavelength region of stimulation light to pass through. After the beam of light has passed through the filter 9, it is incident on the photomultiplier 10, so that the beam of light is photoelectrically converted into an electric current signal corresponding to the intensity of the incident light.

An output current of the photomultiplier 10 is converted into a voltage signal by the current/voltage converter 11, and amplified by the amplifier 12. Then the signal is converted into digital data by the A/D converter 13. In this case, the digital data is a digital radiation image signal, the intensity of which is proportional to an amount of radioactive rays that have transmitted. Then the digital image signal proportional to an amount of transmitted radioactive rays of each portion of the photographic object is successively subjected to image processing by the image processing apparatus 14. After the completion of image processing, the image signal is transmitted to the printer 17 via the interface 16.

Reference numeral 15 is a CPU for controlling the image processing operation conducted in the image processing apparatus 14. The CPU is operated in the following manner: In accordance with the command of the CPU, the digital radiation image data outputted from the A/D converter 13 is subjected by the image processing apparatus 14 to various image processing which includes the gradation processing. For example, the image data is subjected to spatial frequency processing, magnification, reduction, movement, rotation, and statistical processing. Therefore, the image data is outputted from the printer 17 in a form suitable for diagnosis. In this way, a hard copy of the radiation image of a human's bust can be provided by the printer 17.

In this connection, a monitor such as a CRT may be connected to the image processing apparatus 14 via the interface 16. Further, a memory unit (filing system) such as a semiconductor memory unit may be connected to the image processing apparatus 14 via the interface 16.

Reference numeral 18 is a reading gain adjusting circuit. By this reading gain adjusting circuit 18, various adjustment operations can be carried out as follows:

A light beam intensity of the light beam generating section 5 is adjusted. A gain of the photomultiplier 10 is adjusted by regulating the voltage of the high voltage power source 19 for use in the photomultiplier 10. A gain of the voltage converter 11 and that of the amplifier 12 are adjusted. An input dynamic range of the A/D converter 13 is adjusted. Further, a reading gain of the radiation image signal is adjusted.

Figure 3:
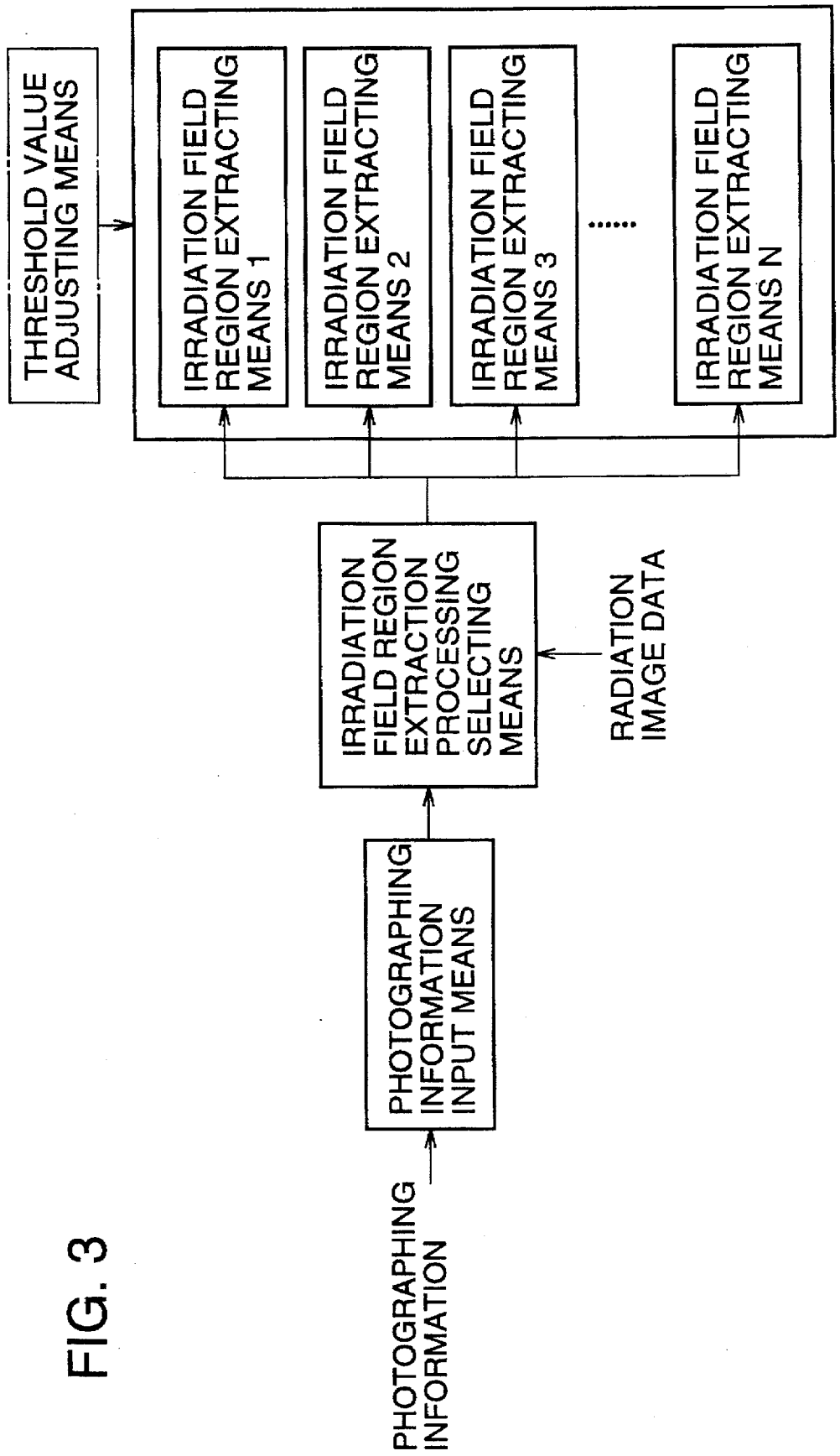
FIG. 3 is a block diagram showing the essential construction of the third invention.

In the image processing apparatus 14, radiation image signals that have been read out are subjected to image processing. In this image processing apparatus 14, an irradiation field region is extracted before the image processing as illustrated in the flow chart in FIG. 3. The reason why the irradiation field region is extracted is to determine the processing condition in accordance with the statistical character of the image data in the irradiation field region and also in accordance with the statistical character of the image data in the concerned region found by the profile information in the irradiation field region.

Figure 5:
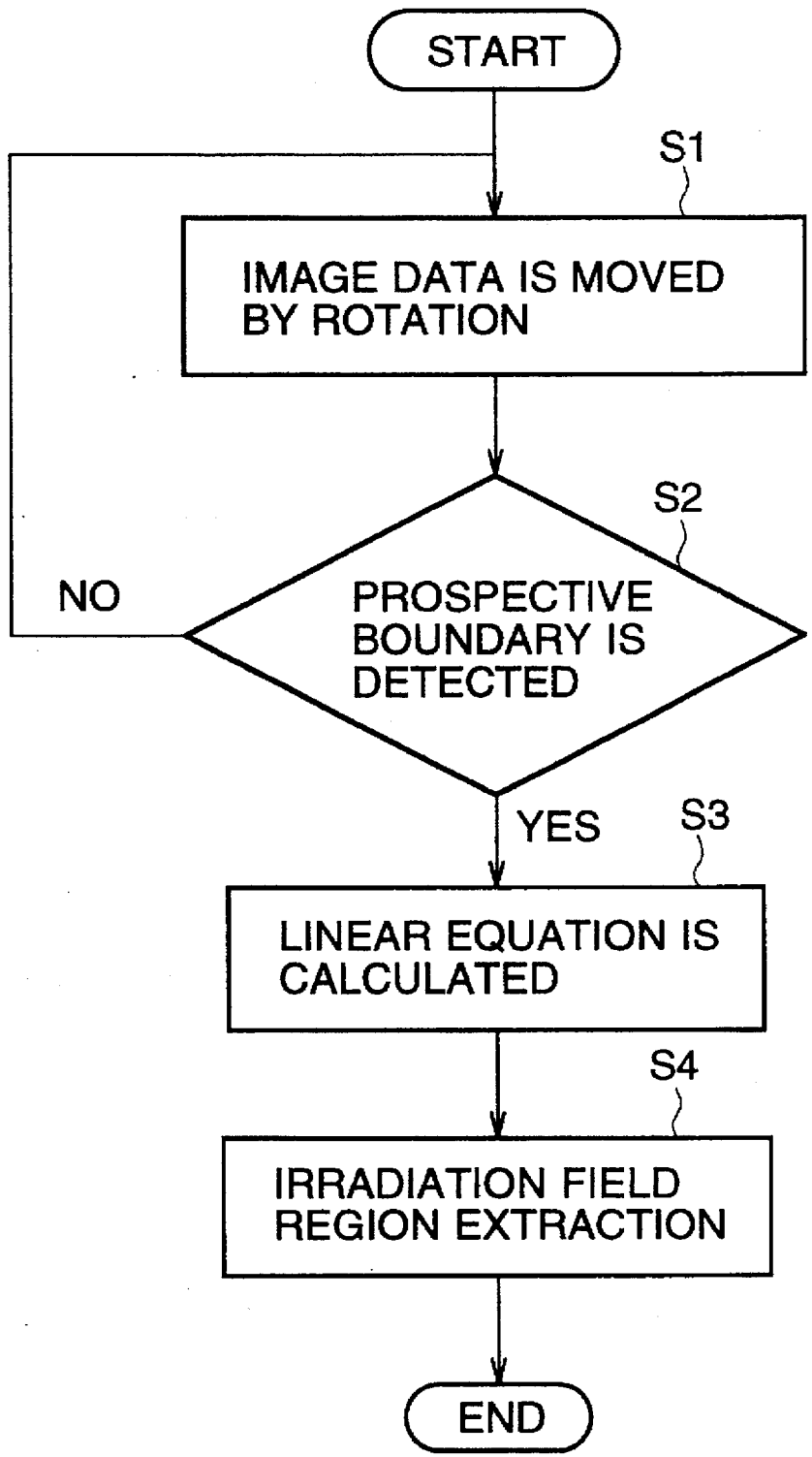
FIG. 5 is a flow chart showing the circumstances of the extraction of the irradiation field region in the example of the first invention.

With reference to the flow chart shown in FIG. 5, the extraction of an irradiation field region will be briefly explained as follows. First, in S1, the number of data of digital radiation image signals photoelectrically read out from the conversion panel 4 is reduced. After that, the position of image data in the rectangular coordinates provided along the sides of the image is rotated around a predetermined rotation axis.

In S2, it is discriminated whether or not a straight line portion prospected as a boundary line between the irradiation field region and the irradiation field stop region becomes parallel with the X or Y axis of the rectangular coordinates.

In S3, after it has been discriminated that the straight line component has become parallel with the X or Y axis of the rectangular coordinates, a linear equation of the straight line component before the rotation is calculated using the distance from the rotational center and the rotational angle.

The processing of S2 and that of S3 are repeated until the rotational angle of S1 exceeds an upper limit or satisfies a predetermined condition. When the irradiation field stop operation is conducted, a linear equation of at least one straight line component can be provided. When a boundary line is not extracted, it is possible to discriminate that the irradiation field stop is not provided.

In S4, the linear equation of at least one straight line calculated in S3 is utilized, so that a region surrounded by the straight line is extracted as an irradiation field region. When it is discriminated in S3 that the irradiation field stop is not provided, an overall surface of the image becomes the irradiation field region.

Figure 1:
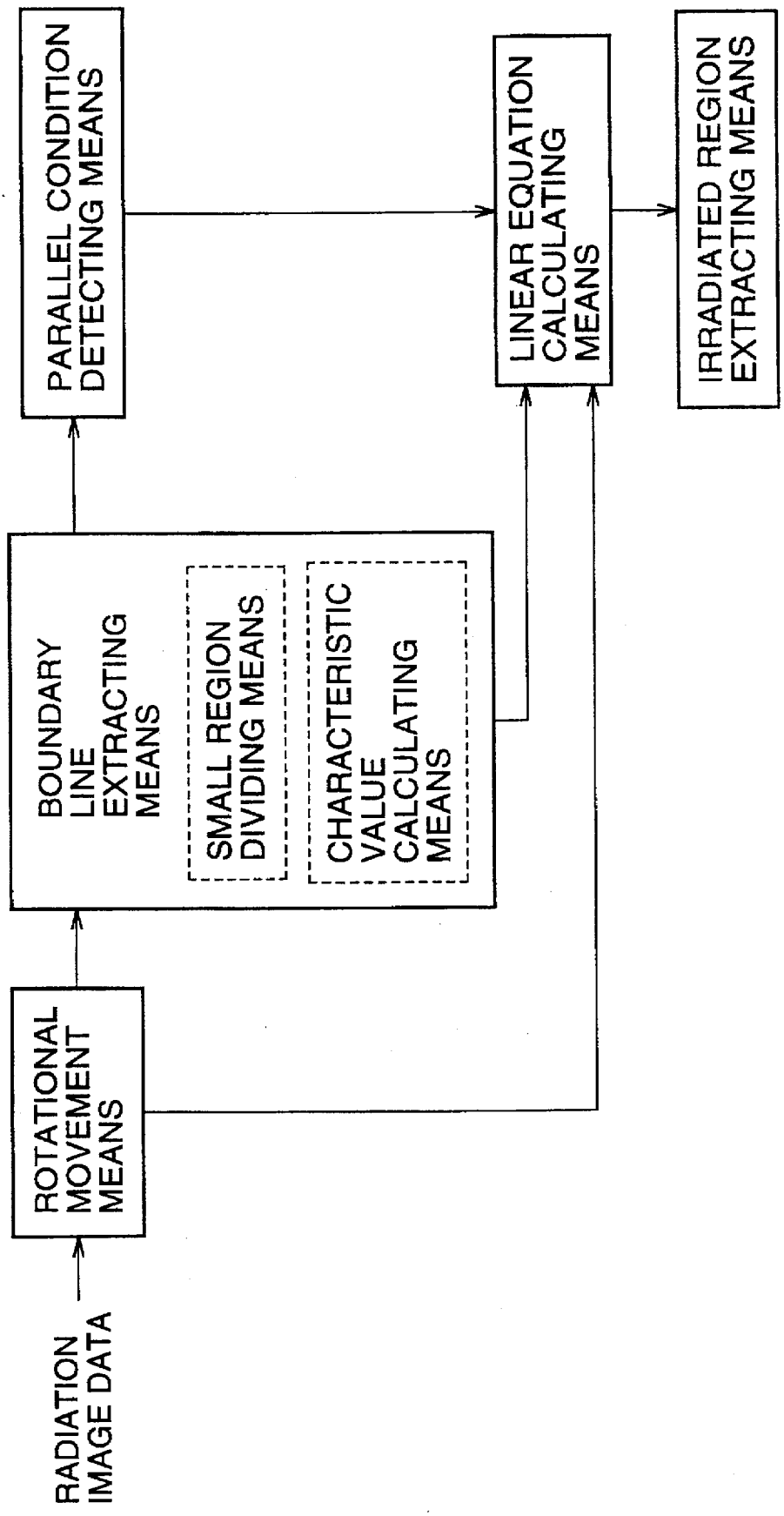
FIG. 1 is a block diagram showing the essential construction of the first invention.
Figure 2:
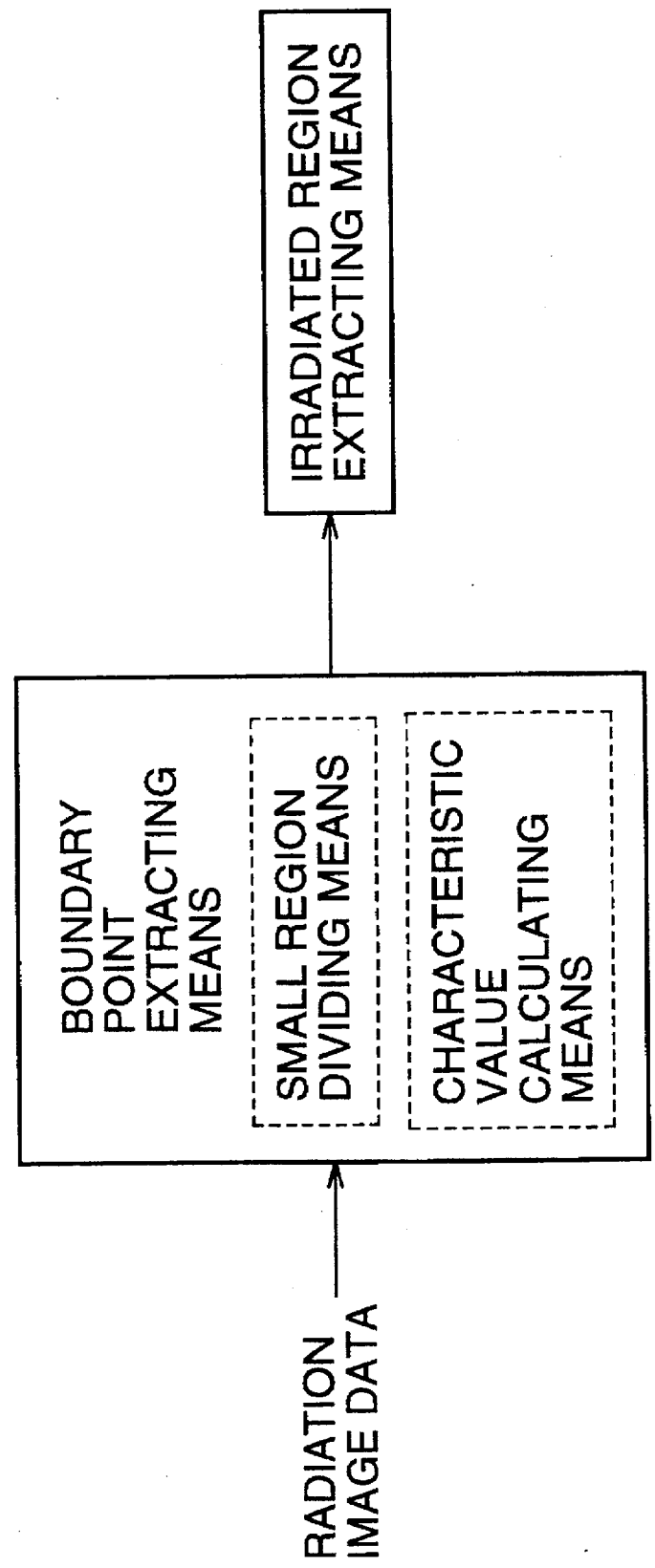
FIG. 2 is a block diagram showing the essential construction of the second invention.

Next, the irradiation field region extracting processing will be explained in detail, which is conducted in an apparatus having the boundary line extracting means including a small region dividing means and a characteristic value calculating means which are shown in FIG. 1, and further including a correction judging means.

First, the rotational movement processing in S1 will be explained. In this case, the rotational movement processing is conducted by the rotational movement means illustrated in FIG. 1. In general, the number of pixels of an original image formed by digital radiation image signals is 2000×2000 to 4000×4000. When the irradiation field region extracting processing is conducted, even if the number of pixels is reduced to 128×128, no problems occur in the accuracy of the image. Accordingly, in order to reduce the processing time, it is preferable that the number of pixels is reduced. A method for reducing the number of pixels is described as follows: An original image of 2000×2000 is divided into small regions of 128×128. An average value and a median in each small region may be used for reducing the number of pixels, and also an arbitrary pixel value of each small region may be used for reducing the number of pixels. The following explanations will be made under the condition that the number of pixels is reduced to 128×128.

Figures 6, 7:
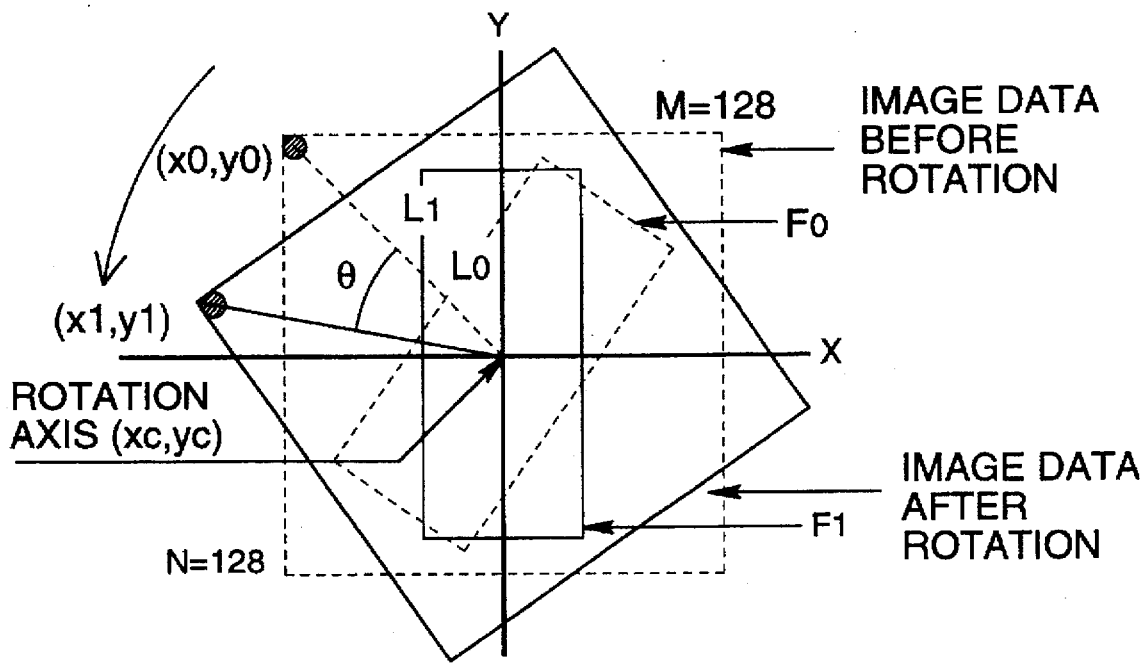
FIG. 6 is a view showing the circumstances of the rotational movement of image data in the extraction of an irradiation field region in the example of the first invention.
FIG. 7 is a view showing the circumstances of division in which the image region is divided into small regions in the example of the first invention.

In many cases, image data is processed by a computer under the condition that the image data is arranged in M lines and N rows (in this explanation, M=128 and N=128). The rotational processing of image data is explained in the schematic illustration of FIG. 6. In FIG. 6, rectangular coordinates are established in such a manner that the X and Y axes are provided along the sides of image data before the rotation. F0 and F1 respectively represent irradiation field regions of image data before and after the rotation. L0 and L1 respectively represent one of the boundary lines between the irradiation field region and the irradiation field stop region before and after the rotation. When image data is rotated by an angle θ around a rotational center of the origin ($X_c$, $Y_c$), that is, when Xc=Yc=64 in this example, the coordinates (X1, Y1) after the rotation of one point (X0, Y0) of image data is introduced by the following equation (1). When this conversion is conducted on all pixels, the image data can be rotated. This rotational processing is conducted little by little at predetermined angles, for example, this rotational processing is conducted little by little at an angle of 5°.

[EQUATION 1]

$$\begin{pmatrix} x1 \\ y1 \end{pmatrix} = \begin{pmatrix} \cos\theta & \sin\theta \\ -\sin\theta & \cos\theta \end{pmatrix} \begin{pmatrix} x0 \\ y0 \end{pmatrix} + \begin{pmatrix} x_c(1-\cos\theta) - y_c\sin\theta \\ x_c\sin\theta + y_c(1-\cos\theta) \end{pmatrix} \quad (1)$$

This rotational processing is not necessarily conducted on all pixels of an image, the number of pixels of which is reduced to 128×128. When the small region dividing means and the characteristic value calculating means shown in FIG. 1 are used, the rotational processing can be conducted at higher speed. The reason is described as follows:

A boundary line between the irradiation field region and the irradiation field stop region is most important in the processing conducted later, and in order to find an approximate position of this boundary line, all pixels are not necessarily required.

The foregoing will be explained below. For example, as illustrated in FIG. 7, an image of 128×128 is divided into small regions of 4×4 pixels. Then a group of small regions, the number of which is 32×32, can be provided.

In these small regions, the characteristic values are found, that is, the dispersion value or the standard deviation of 16 pixel values are found, or alternatively a difference between the maximum and the minimum is found. In this case, the maximum may be a substantially maximum value, or the maximum may be a value which is a little smaller than the substantially maximum value while consideration is given to the error. With respect to the minimum, the circumstances are the same. It has already been known that the found characteristic values are high in a small region including the boundary between the irradiation field region and the irradiation field stop region (shown in Japanese Patent Publication Open to Public Inspection No. 7579/1993. In this case, in some regions not including the boundary, the characteristic values are high. However, when a small region is detected in which the characteristic value is higher than a predetermined value, it is possible to detect at least a small region located close to the boundary. Consequently, when only representative points in all small regions are subjected to the rotational processing, or when only representative points in small regions having the characteristic values higher than a predetermined value are subjected to the rotational processing, an amount of calculation can be effectively reduced. In this case, the representative point may be defined as a pixel at the left upper corner or at the center in the small region.

The following explanations will be made under the following condition:

An image, the number of pixels of which is reduced, is further divided into small regions by the small region dividing means and the characteristic value calculating means. After the characteristic value of each small region has been found, all small regions are subjected to the rotational processing by the representative points.

Next, the parallel condition detecting processing in S2 will be explained below, that is, the processing detected by the parallel condition detecting means shown in FIG. 1 will be explained.

It is discriminated whether or not a boundary candidate has been detected each time the rotational processing is conducted by a predetermined angle in S1. The boundary candidate is detected by discriminating whether or not a straight line component estimated to be a boundary between the irradiation field region and the irradiation field stop region is parallel with the X or Y axis shown in FIG. 6. This operation will be explained with reference to FIG. 8.

Figure 8:
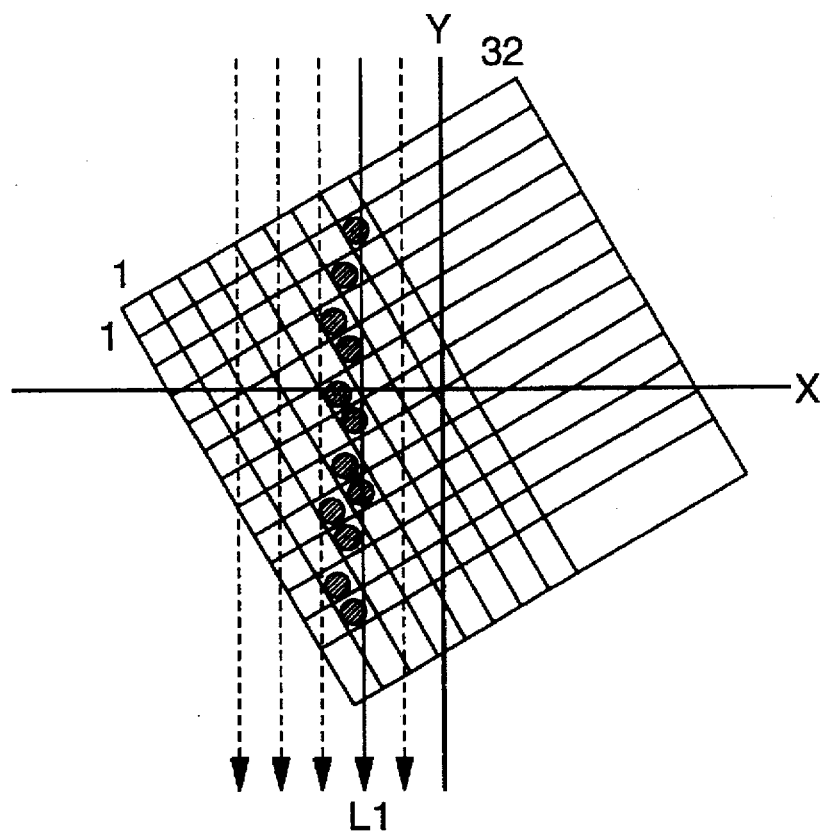
FIG. 8 is a view showing the circumstances of the extraction of a boundary line from image date after the rotational movement in the example of the first invention.

In FIG. 8, image data after the rotation in FIG. 6 is expressed by the unit of a small region. The rotational processing is conducted by a predetermined angle. Each time the rotational processing has been completed, the number of small regions is counted, the characteristic values on the lines parallel with the X and Y lines of which is not less than a predetermined value. FIG. 8 shows a state in which the counting operation is conducted on each line parallel with the Y axis. A line on which the small regions exist, the number of which is not less than a predetermined value, is assumed to be a candidate of L1 of the boundary between the irradiation field region and irradiation field stop region. In this case, the counting operation is conducted in parallel with the Y axis. The rotational processing is conducted until the candidate of L1 is found. When a candidate of L1 can not be found even after the rotational processing has been conducted to a predetermined maximum angle, it is assumed that the irradiation field stop does not exist. In this example, the counting operation is conducted in parallel with the X and Y axes in a positive and negative directions. Therefore, when it is rotated by the maximum angle of 90°, the counting operation can be conducted on all lines.

Next, the calculation processing of the linear equation in S3 will be explained below. In this case, the calculation processing of the linear equation in S3 is conducted by the linear equation calculating means in FIG. 1.

Figure 9:
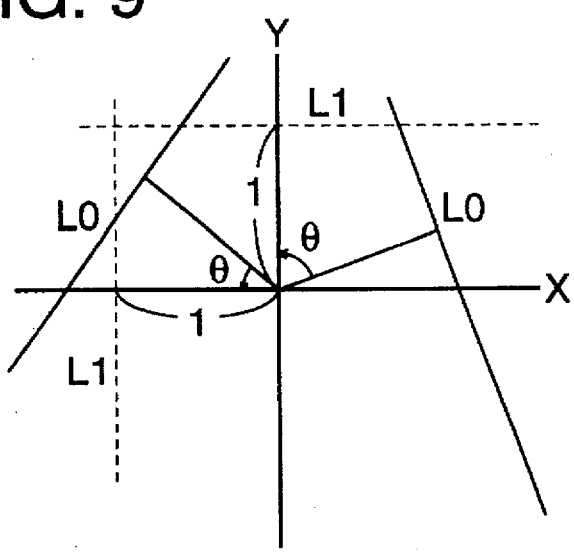
FIG. 9 is a view showing the circumstances of finding the linear equation of the boundary line in the example of the first invention.

After the candidate of L1 has been found in the processing of S2, the linear equation is calculated. In this case, the rotational processing is conducted counterclockwise. When the candidate of L1 is detected under the condition that the candidate of L1 is parallel with the Y axis in a negative range with respect to the X axis as illustrated in FIG. 8, a linear equation of L0 of the image before the rotation shown in FIG. 6 is expressed to be the equation (2-1) by a rotational angle $\theta$ and a distance l between the origin and L1 (Refer to FIG. 9).

When L1 is parallel with the Y axis, the equation is expressed as follows.

$$y = -\cos(180-\theta)/\sin(180-\theta) \cdot x + l/\sin(180-\theta) \qquad (2-1)$$

When L1 is parallel with the X axis, the equation is expressed as follows.

$$y = -\cos(90-\theta)/\sin(90-\theta) \cdot x + l/\sin(90-\theta) \qquad (2-2)$$

Figure 10:
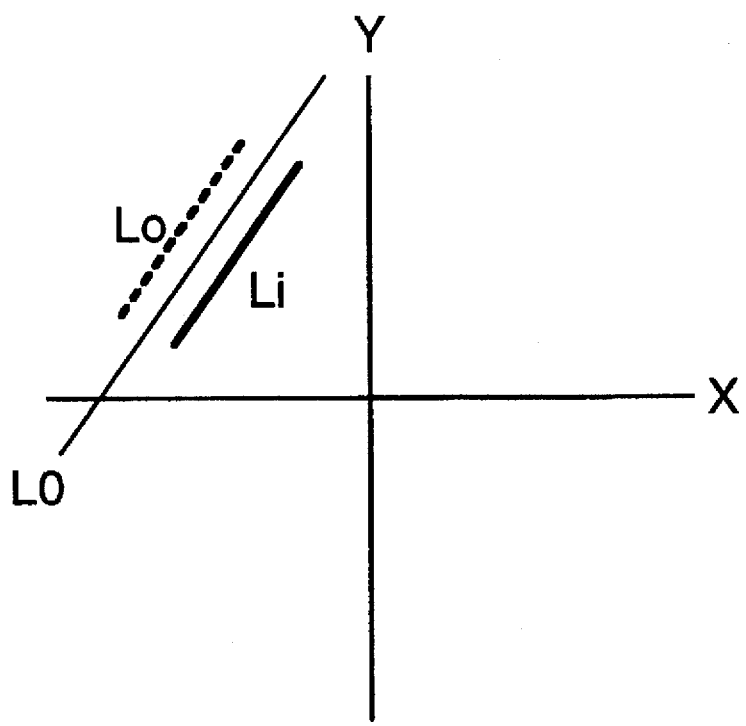
FIG. 10 is a view showing the circumstances of judgment of the linear equation in the example of the first invention.

The linear equation of L0 found in the above manner is related to the candidate L0 obtained in S2. Accordingly, there is a possibility that not only the irradiation field edge but also other portions are detected. Therefore, it is preferable that the correction judging means for judging the candidate is provided. For example, this correction judging means is constructed in the following manner:

As illustrated in FIG. 10, straight lines Li and Lo are provided inside and outside of the straight line L0 being parallel with the straight line L0. Pixel values of the pixels existing on the straight lines Li and Lo are found and compared with each representative value. When L0 is a real irradiation field edge, the inside of L0 is an irradiation field region, so that the pixel values are high as a whole, and the outside of L0 is an irradiation field stop region, so that the pixel value is low as a whole. Accordingly, the correction judgment can be conducted in such a manner that a difference between both pixel values is found and whether or not L0 is a real irradiation field edge is judged by the difference. In this case, the maximum and minimum of the signal of Li and Lo, the average and the median can be used as the representative value of the inside and outside. That is, any values capable of expressing an outline of the pixel values on Li and L0 can be used as the representative value of the inside and outside. When it is judged by the correction judging means that the detected irradiation field edge is not correct, the program returns to S1, and the image data is rotated again.

In many cases, the irradiation field is formed to be rectangular. Therefore, an edge corresponding to another side must be detected. In this case, when L0 is detected, another side can be calculated on the assumption that another side is parallel with or perpendicular to L0. Accordingly, the rotational processing is not necessarily conducted. In this way, at least one irradiation field edge can be provided. In other words, it is possible to recognize that the irradiation field stop region does not exist.

Next, the irradiation field region extracting processing in S4 will be explained as follows. In this case, the irradiation field region extracting processing is conducted by the irradiation field region extracting processing means shown in FIG. 1. A region surrounded by at least one irradiation field edge found in S3 is recognized as the irradiation field region. In the case of FIG. 11(a), (x, y) satisfying the following inequalities are extracted as a pixel in the irradiation field region.

$$y < a1 \cdot x + b1$$

$$y > a2 \cdot x + b2$$

$$y > a3 \cdot x + b3$$

$$y < a4 \cdot x + b4$$

In this connection, FIG. 11(b) is a case in which the number of the irradiation field edge is one, FIG. 11(c) is a case in which the number of the irradiation field edges is two, and FIG. 11(d) is a case in which the number of the irradiation field edges is three.

When the gradation processing condition is found in accordance with the thus determined image data in the irradiation field region in the image, the number of pixels of which has been reduced, sufficient accuracy can be maintained with respect to the original image (2000×2000).

As described above, in the apparatus according to the first embodiment, the detection of a boundary edge is easily conducted when the image data is rotated. Therefore, even when the irradiation field region is formed into a rectangle inclined with respect to a side of the image data, the irradiation field region can be accurately extracted. Of course, when the irradiation field region is formed into a rectangle not inclined with respect to the side of the image data, the irradiation field region can be accurately extracted. Of course, even when the irradiation field region is formed into an arbitrary polygon, the irradiation field region can be extracted.

In this example, the image region is divided into small regions and a boundary line is extracted in accordance with the characteristic values of image data in the small regions. Accordingly, the boundary line can be accurately extracted in a short period of time using a relatively small amount of image data. However, it is possible that the boundary line is directly extracted from the values of pixels, the number of which has been reduced to 128×128 while the region is not divided. For example, the extracting operation can be carried out in the following manner:

In the image data, the pixel number of which has been reduced after the rotational processing, the pixel values are compared with those of peripheral pixels, and pixels greatly different from the periphery pixels are found. When these pixels are aligned in a line parallel with the X or Y axis, the line is regarded as a boundary line and extracted.

Next, the second example of the irradiation field region extracting apparatus for radio active ray images will be explained as follows.

In the first example described above, an inclined rectangular irradiation field region or a polygonal irradiation field region can be extracted, however, it is impossible to extract an irradiation field region, the configuration of which is composed of a curve such as an arc. According to the apparatus of this example, an irradiation field region, the configuration of which is arbitrary, for example, the configuration of which is composed of a curve such as an arc, can be extracted. Concerning the hard ware, the apparatus shown in FIG. 4 can be used. With reference to the flow chart shown in FIG. 12, the irradiation field region extracting processing conducted by the apparatus of this example will be explained as follows.

S11 and S12 in which the first boundary point region is found by the raster scanning In the same manner as that of the example described before, the original image data of 2000×2000 is reduced to 128×128 and further divided into small regions in which the number of pixels of each small region is 4×4. Therefore, a group of small regions, the number of which is 32×32, are made. Then the image is subjected to raster scanning. In these small regions, the characteristic values are found, that is, the dispersion value, the standard deviation value, and a difference between the maximum and the minimum values are calculated from 4×4 pixel data. In accordance with the characteristic values, it is judged whether or not a boundary line between the irradiation field region and the irradiation field stop region is included. The scanning operation is repeatedly conducted until a small region including the boundary line is found (Refer to FIG. 13(c)). This small region is referred to as a boundary pint region.

S13 (follow-up of the peripheral region)

After the boundary point region has been found, a follow-up of the boundary line is started, wherein the first boundary point region a(0) is used as a starting point. The follow-up of the boundary line is conducted in the following manner: It is judged whether or not the small regions adjacent to the periphery of the boundary point region a(0) is a boundary point region. For example, the operation is started from a non-boundary point region adjacent on the left, and the judgment is conducted counterclockwise as shown in FIG. 13(a).

S14 and S15 in which the existence of the boundary point region is judged

When all the 8 small regions in the periphery are non-boundary point regions, it is assumed that the point a(0) is an isolated point, and the follow-up of the boundary line is finished. Then the program returns to step 11, and the raster scanning operation is started again so that another boundary point region is found. In this case, the small regions that have already been subjected to judgment for judging the boundary point region are marked, so that the judging operation is not conducted twice. In the case of raster scanning, the circumstances are the same.

S14 (Judgment of completion of a follow-up)

When a boundary point region has been found in the periphery of a(0), the same follow-up operation is conducted on the small regions around the boundary point region a(1). For example, the starting point of the follow-up operation is set at the boundary point region a(0), and the operation is conducted counterclockwise in the sequence shown in FIG. 13(a).

If next boundary point a(1) is found as shown in FIG. 13(b), the next follow-up operation is started from the region next to the first-found boundary point a(0) in the counterclockwise direction. As the result, another boundary point a(2) can be found.

When the boundary point region has been first found in the periphery of one boundary point region, it is not necessary to conduct a follow-up operation on the other small regions in the periphery, and the operation may be shifted to the peripheral region, wherein a new boundary point region is used as a start point. However, there is a possibility that a plurality of boundary point regions continuously exist in the periphery of the boundary point region. Therefore, when the next small region is followed up and the boundary point regions are continuously found, the follow-up operation is further continued, and a new peripheral region may be followed up while the continuous last boundary point region is used as a start point.

When the peripheral region of the boundary point region is followed up which has been first found in the process of raster scanning, it is known that small regions on the upper side and on the left of the boundary point region are non-boundary point regions. Accordingly, the following-up time can be shortened in the following manner:

The operation is started at a right small region adjacent to the boundary point region, and then the follow-up operation is conducted in the order of a right lower, lower and left lower small region. There is a high possibility that the next boundary point region exists in the same direction as that of a straight line connecting one boundary point region with a boundary point region in the periphery. For example, when a direction of the straight line connecting the previously found boundary point regions is right or lower right, there is a high possibility that the next boundary point region exists in the same direction. Therefore, the follow-up operation is started at an adjacent small region on the right or lower right with respect to the previously found boundary point region.

S16 (judgment of completion of boundary line follow-up)

In the way described above, a(0), a(1), a(2), . . . are successively found. When a(m)=a(0) and a(m+1)=a(1) at an arbitrary value m, the boundary line follow-up is completed. Actually, this judgment is carried out until the boundary point is found. When the boundary point is not found, a new follow-up operation is started.

S18 (Extraction of the irradiation field region)

A portion surrounded by the boundary line connecting the boundary point regions described above is extracted as an irradiation field region.

In this way, extraction can be carried out in a short period of time with respect to an irradiation field region, the configuration of which is arbitrary.

As explained above, this example adopts a system in which the region is divided into a plurality of small regions and the boundary point region is found according to the characteristic values obtained from a plurality of pixel data. This system is advantageous in that the accuracy is high and the follow-up is completed in a short period of time. However, it is possible that the boundary line is directly extracted from the values of pixels, the number of which has been reduced to 128×128 while the region is not divided. In this case, the raster scanning operation is carried out, and a portion where the pixel value is greatly changed is found as the first boundary point, and the pixels in the periphery are followed up, and a portion where pixel values are greatly changed is found as the next boundary point.

Next, the third example of the irradiation field region extracting apparatus for radio active ray images will be explained as follows.

In the present embodiment, it is utilized that the irradiation field region is determined by the photographing information such as a photographed portion, photographed posture, photographing method and photographing condition. The photographing information will be shown below.

Photographed Portion
Names of human body's portion to be photographed
Chest, abdomen, thoracic vertebrae, knee joint, pelvis, mamma, and so on.
Photographed posture
Posture of human's body to be photographed anteroposterior projection, posteroanterior projection, oblique projection, lateral projection, and so on.

Photographic object information

Information about patient's figure and constitution Fat or thin, adult or child, male or female, and so on.

Photographing method

Simple photography, angiography, and tomography, and so on.

Photographing condition

Bulb voltage of the radioactive ray generating source, bulb current, radioactive ray irradiating time, existence of the grid, distance from the X ray generating source to the human's body (or plate), and so on.

In the case of photographing a radiation image, in order to obtain a desire visual image, the aforementioned photographing information is taken into consideration. In many cases, characteristics are included in the obtained image data and the irradiation field region in the image data. The characteristics are classified to items and described as follows.

Configurational characteristics

This is a characteristic with respect to geometrical configurations of the irradiation field region, for example, a rectangle square, are undefined figure, and so on. Further, symmetry with respect to an arbitrary point or a straight line is one of the geometrical characteristics. When the irradiation field region configuration is rectangular or square, whether or not each side of the rectangle or square is parallel with a side of the image data is also one of the geometrical characteristics.

Positional characteristics

This is a characteristic with respect to the position of the irradiation field region that is established in the image data. Whether the irradiation field region is located at the center of an image or the irradiation field region is located close to the side of the image is one of the characteristics.

Characteristics of image constitution

Contrast of the irradiation field region, distribution of the signal, and an amount of noise component are the examples of the characteristics of image constitution.

Characteristics of the irradiation field region with respect to an example of the aforementioned photographing information are described as follows.

Photographing information

Photographed portion: chest

Photographed posture: posteroanterior projection

Photographing condition: 80 KVp, 100 mAs, 100 cm, and no grid

The above conditions are information to be inputted in the case of photographing the standard breast image. When the breast is photographed in accordance with the aforementioned information, the irradiation field stop is not provided in many cases. Alternatively, even if the irradiation field stop is provided, it is only provided in the lower side of the image (shown in FIG. 14(a)).

Accordingly, the characteristics of the irradiation field region are as follows.

Configurational characteristics: A rectangle parallel with a side of the image. The rectangle is laterally symmetrical with respect to a center of the image.

Positional characteristics: The irradiation field stop region is provided only in a lower portion of the image. The irradiation field region is located on the upper side.

Characteristics of image constitution: Selection is made between high voltage photography (low contrast) and low voltage photography (high contrast).

As described above, the boundary line between the irradiation field region and the irradiation field stop region is located on the lower side of the image. Therefore, the boundary may be extracted while consideration is given only to the lower side of the image. Accordingly, the extracting time can be shortened.

When extremeties are photographed, for the purpose of utilizing the effective area of the plate at the maximum, the irradiation field stop is disposed being inclined with respect to a side of the image (Refer to FIG. 14(b)). In this case, the boundary line may be extracted by the rotational processing of image data conducted by the first irradiation field region extracting device described before, so that the irradiation field region can be extracted.

When the bust is photographed, a configuration of the irradiation field is arcuate (shown in FIG. 14(c)). Therefore, the irradiation filed region can be extracted by the boundary line extracting operation conducted by the second irradiation field region extracting device. In the case of photographing the lumbar in a transverse direction, a wave-shaped change is caused in the signal in a direction of the back of a humans' body being influenced by a constricted part of the lumbar (Refer to FIG. 14(d)). In order to simplify the explanation, the photographing information is limited to the photographed portion and the photographed posture. Therefore, the irradiation field region extracting processing is selected because these portions does not mistake these portions for a boundary line.

As described above, the characteristics of the irradiation field region are determined by the photographing information. Accordingly, when an irradiation field region extracting method most appropriate for the characteristics of each irradiation field region is applied, the extracting accuracy can be remarkably enhanced. In this case, the construction of the photographing control device is as follows. "Chest-Posteroanterior", "Chest-Lateral", "Lumber-Posteroanterior" and "Lumber-Lateral" are prepared as the photographing menu, and according to the selected photographing menu, a predetermined irradiation field region extracting processing may be applied. Alternatively, the "Chest", the "Lumber" and the like are prepared as the photographed portion menu, and "Posteroanterior", "Lateral" and the like are prepared as the photographed posture menu, and they may be combined to provide the most appropriate irradiation field extracting method.

In either case, if a parameter exists which is common among a plurality of irradiation field region extracting methods, the effect can be enhanced when the threshold value of the parameter is adjusted in accordance with the photographing menu. For example, when a comparison is made between a photographed image of the breast of an adult and that of a child, an area of the irradiation field region of an adult is larger than that of a child, so that the length of the boundary in the case of an adult is longer than that in the case of a child. Therefore, when the boundary line is extracted by the first irradiation field region extracting device, a threshold value for judging the boundary line candidate, which is compared with the number of small regions of which the characteristic values are not less than a predetermined value, is adjusted to be higher in the case of an adult than that in the case of a child. In this way, the extraction accuracy can be enhanced. When a boundary line is extracted with respect to an image of low contrast and an image of high contrast, a ratio of contrast on both sides of the boundary line is lower in the image of low contrast than that in the image of high contrast. Accordingly, when a threshold value for judging the boundary point region, which is compared with the characteristic value of a small region, is adjusted to be lower in the image of low contrast than that in the image of high contrast, the extracting accuracy can be enhanced. Of course, the same extracting method may be applied to different photographing menus. In this case, even if only the parameter is adjusted, remarkable effect can be provided.

The construction is shown in FIG. 15.

As explained above, according to the first embodiment, even when an image is photographed under the condition that a rectangular irradiation field region is located being inclined with respect to a side of the image, or even when the image is photographed under the condition that a polygonal irradiation field region is established, the irradiation field region can be extracted by finding a linear equation of the boundary line. When the image region is divided into small regions and the characteristic values of image data in the small regions are calculated, a boundary line can be extracted in accordance with the characteristic values using a relatively small amount of image data. When the dispersion value, the standard deviation and the difference between the maximum and minimum values included in image data in the small regions are used as the characteristic values, the boundary line can be easily extracted.

According to the second embodiment, with respect to an irradiation field region, the configuration of which is arbitrary, for example, the configuration includes an arc and other curves, the irradiation field region can be extracted with the minimum follow-up operation. Even in this case, when the image region is divided into small regions and the characteristic values of image data in the small regions are calculated, a highly accurate extraction can be conducted in a short period of time.

According to the third embodiment, in accordance with the configurational characteristics, positional characteristics and characteristics of image constitution based on the photographing information such as a photographed portion, photographed posture, photographing method and photographing condition, the most appropriate processing for the extraction of the irradiation field region is carried out, so that a highly accurate extraction can be conducted in a short period of time. Since the parameter necessary for irradiation field region extracting processing is conducted in accordance with the aforementioned characteristics, the extracting accuracy can be further enhanced.

What is claimed is:

1. An irradiation field region extracting apparatus for extracting an irradiation field region from a radiation image, comprising:
   a rotational movement means for rotationally moving image data corresponding to said radiation image around a predetermined rotational center of said image data, said image data having rectangular coordinates set thereon;
   a boundary line extracting means for extracting a boundary line between said irradiation field region, where said radiation image is exposed, and an irradiation field stop region, where no radiation image is exposed, according to said image data rotationally moved by said rotational movement means;
   a parallel condition detecting means for detecting a parallel condition of said boundary line, extracted by said boundary line extracting means, wherein said boundary line is parallel to an axis of said image data, and for generating rotation information data which indicate an angle of a rotational movement of said boundary line from an original location to a location of said parallel condition and a distance between said predetermined rotational center and a given point on said boundary line;
   a linear equation calculating means for calculating a linear equation of said boundary line, originally located before the rotational movement, in accordance with said rotation information data; and
   an irradiation region extracting means for extracting a region, which is surrounded by a plurality of boundary lines calculated in accordance with said linear equation, as said irradiation field region.

2. An irradiation field region extracting apparatus for extracting an irradiation field region from a radiation image, comprising:
   (i) a boundary point extracting means for extracting a plurality of continuous boundary points on a boundary line between said irradiation field region, where said radiation image is exposed, and an irradiation field stop region, where no radiation image is exposed, said boundary point extracting means comprising:
      a small region dividing means for dividing said radiation image into a plurality of small regions; and
      a characteristic value calculating means for calculating a characteristic value of each of said plurality of small regions;
      wherein said characteristic value includes at least one of a dispersion value, a standard deviation value, and a difference between a maximum value and a minimum value calculated from pixel data of each of said plurality of small regions; and
      wherein said boundary point extracting means extracts said plurality of continuous boundary points by successively judging whether or not each of ones of said plurality of small regions peripheral to a target small region comprises a part of said boundary line according to said characteristic value respectively corresponding to each of said ones of said plurality of small regions peripheral to said target small region; and
   (ii) an irradiated region extracting means for extracting a region which is surrounded by said plurality of continuous boundary points as said irradiation field region.

3. An irradiation field region extracting apparatus for extracting an irradiation field region from a radiation image, comprising:
   a photographic information input means for inputting photographic information with respect to said radiation image when said radiation image is obtained, said photographic information including at least object characteristic information and photographing environmental conditions;
   a plurality of irradiation field region extracting means each for extracting said irradiation field region from said radiation image according to a respective predetermined irradiation field region extraction process; and
   an irradiation field region extraction processing selecting means for selecting one of said plurality of irradiation field region extracting means to extract said irradiation field region from said radiation image according to said photographic information inputted by said photographic information input means,
   wherein said plurality of irradiation field region extracting means includes at least one of:
      an irradiation field region extracting means having a rotational movement means for rotationally moving image data corresponding to said radiation image around a predetermined rotational center of said image data, said image data having rectangular coordinates; and an irradiation field region extracting means having a boundary point extracting means for extracting a plurality of continuous boundary points by successively judging whether or not each of a plurality of small regions peripheral to a target small region comprises a part of a boundary line between said irradiation field region and an irradiation field stop region.

4. The irradiation field region extracting apparatus of claim 3, further comprising:

a threshold value adjusting means for adjusting a threshold value corresponding to said one of said plurality of irradiation field region extracting means which is selected by said irradiation field region extraction processing selecting means.

5. The irradiation field region extracting apparatus of claim 3, wherein:

said object characteristic information includes at least one of a photographed portion information, a photographed posture information and photographic object information; and said photographing environmental conditions includes at least one of a photographing method, a photographing condition, configurational characteristics of object, positional characteristics, and image constitution characteristics.

* * * * *